US010722098B2

(12) United States Patent
Koepke et al.

(10) Patent No.: US 10,722,098 B2
(45) Date of Patent: Jul. 28, 2020

(54) DUAL CHECK VALVE FLUID CIRCULATION SYSTEM FOR DISHWASHER APPLIANCES

(71) Applicant: Haier US Appliance Solutions, Inc., Wilmington, DE (US)

(72) Inventors: Steven Chadwick Koepke, La Grange, KY (US); Kyle Edward Durham, Louisville, KY (US); Craig Curtis, Crestwood, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 16/169,419

(22) Filed: Oct. 24, 2018

(65) Prior Publication Data
US 2020/0132201 A1    Apr. 30, 2020

(51) Int. Cl.
| | | |
|---|---|---|
| A47L 15/42 | (2006.01) | |
| F16K 11/052 | (2006.01) | |
| F16K 15/18 | (2006.01) | |
| F16K 31/22 | (2006.01) | |
| F16K 15/03 | (2006.01) | |
| F16K 11/074 | (2006.01) | |

(52) U.S. Cl.
CPC ....... *A47L 15/4223* (2013.01); *A47L 15/4217* (2013.01); *A47L 15/4221* (2013.01); *F16K 11/052* (2013.01); *F16K 11/074* (2013.01); *F16K 15/036* (2013.01); *F16K 15/038* (2013.01); *F16K 15/181* (2013.01); *F16K 31/22* (2013.01); *A47L 2501/03* (2013.01); *Y10T 137/784* (2015.04); *Y10T 137/7843* (2015.04); *Y10T 137/7891* (2015.04); *Y10T 137/86171* (2015.04)

(58) Field of Classification Search
CPC ....... Y10T 137/86171; Y10T 137/7891; Y10T 137/784; Y10T 137/7843; F16K 15/038; F16K 15/036; F16K 11/074; A47L 15/4217; A47L 15/4221; A47L 15/4223; A47L 2501/03
See application file for complete search history.

(56) References Cited

U.S. PATENT DOCUMENTS

| | | | | |
|---|---|---|---|---|
| 2,458,710 A | * | 1/1949 | Kempton | ............... F16K 15/028 137/454.2 |
| 2,565,798 A | * | 8/1951 | Borzell | ............... A47L 15/0089 134/103.2 |
| 3,088,474 A | * | 5/1963 | Leslie | ................. A47L 15/0049 134/113 |

(Continued)

FOREIGN PATENT DOCUMENTS

CN    204542007 U    8/2015

*Primary Examiner* — Atif H Chaudry
(74) *Attorney, Agent, or Firm* — Dority & Manning, P.A.

(57) ABSTRACT

A fluid circulation assembly for a dishwasher appliance includes a pump, a diverter, and a valve. The diverter includes an inlet and a plurality of outlet ports. The inlet of the diverter is in fluid communication with the pump for receiving fluid from the pump. The valve is in fluid communication with the diverter via one or more of the plurality of outlet ports. The valve includes a housing, a dual check valve assembly mounted in the housing and a plurality of conduits. The dual check valve assembly selectively directs fluid from the diverter to one or more of the plurality of conduits.

16 Claims, 8 Drawing Sheets

(56) References Cited

U.S. PATENT DOCUMENTS

| | | | |
|---|---|---|---|
| 7,594,513 B2 | 9/2009 | VanderRoest et al. | |
| 8,161,995 B2* | 4/2012 | Armstrong | A47L 15/4221 |
| | | | 134/56 D |
| 2004/0103926 A1* | 6/2004 | Ha | A47L 15/4221 |
| | | | 134/57 D |
| 2009/0178698 A1* | 7/2009 | Delgado | A47L 15/22 |
| | | | 134/57 D |
| 2010/0139698 A1 | 6/2010 | Gnadinger et al. | |
| 2011/0114140 A1* | 5/2011 | Heisele | A47L 15/0015 |
| | | | 134/56 D |
| 2012/0266924 A1 | 10/2012 | Boyer et al. | |
| 2013/0000762 A1 | 1/2013 | Buddharaju et al. | |

* cited by examiner

DUAL CHECK VALVE FLUID CIRCULATION SYSTEM FOR DISHWASHER APPLIANCES

FIELD

The subject matter of the present disclosure relates generally to dishwasher appliances, and more particularly to fluid circulation systems within dishwasher appliances.

BACKGROUND

Dishwasher appliances generally include a tub that defines a wash compartment. Rack assemblies can be mounted within the wash chamber of the tub for receipt of articles for washing. Spray assemblies within the wash chamber can apply or direct wash fluid towards articles disposed within the rack assemblies in order to clean such articles. Multiple spray assemblies can be provided including e.g., a lower spray arm assembly mounted to the tub at a bottom of the wash chamber, a mid-level spray arm assembly mounted to one of the rack assemblies, and/or an upper spray assembly mounted to the tub at a top of the wash chamber.

Dishwasher appliances further typically include a fluid circulation system which is in fluid communication with the spray assemblies for circulating fluid to the spray assemblies. Such fluid circulation systems typically include at least one pump for circulating fluid through the multiple spray assemblies. In addition, a device, referred to as a diverter, may be used to control the flow of fluid received from the pump. For example, the diverter can be used to selectively control which spray assemblies receive a flow of fluid. In one construction, the diverter uses an electrically powered motor to rotate a valve between different ports for fluid control. Another construction uses a hydraulically actuated rotation mechanism to position a diverter valve to provide the desired fluid flow between spray assemblies without the need for a motor.

The diverter is a significant tool for complying with government regulations related to total energy and water usage for a dishwasher cycle. For example, a dishwasher may use a diverter to run only one spray assembly at a time, thereby decreasing the amount of water required to run a cycle compared to a dishwasher that runs all spray assemblies at the same time. Therefore, a dishwasher with a diverter may be more capable of meeting government regulations than a dishwasher without a diverter. However, because only one rack is being washed at a time, the total cycle time must increase so that the total wash time for each rack and the overall wash performance may be maintained. Although diverters are useful in meeting governmental regulations, conventional diverters typically provide little versatility to a user in selecting different flow combinations, which can increase cycle times and lead to a poor consumer perception of the washing machine appliance.

Accordingly, a dishwashing appliance that can be configured to selectively control the flow of fluid through one or more different spray assemblies or other fluid elements would be useful. More particularly, a diverter for a dishwasher appliance providing reliable, versatile, and useful flow combinations to a plurality of spray assemblies using variable flows paths and rates would be especially beneficial.

BRIEF DESCRIPTION

Aspects and advantages of the invention will be set forth in part in the following description, or may be obvious from the description, or may be learned through practice of the invention.

In an aspect of the present disclosure, a dishwasher appliance is provided. The dishwasher appliance defines a vertical direction, a lateral direction, and a transverse direction that are mutually perpendicular. The dishwasher appliance includes a tub defining a wash chamber for receipt of articles for washing. A lower spray assembly is located in the wash chamber and configured to direct a spray of fluid into the wash chamber. An upper spray assembly is located in the wash chamber above the lower spray assembly along the vertical direction. The upper spray assembly is configured to direct a spray of fluid into the wash chamber. A sump is positioned at a bottom of the wash chamber for receiving fluid from the wash chamber. The dishwasher appliance also includes a fluid circulation assembly disposed within the sump. The fluid circulation assembly includes a pump in fluid communication with the sump. The pump is configured to draw fluid from the sump. The fluid circulation assembly also includes a diverter comprising an inlet in fluid communication with the pump for receiving fluid from the pump and a plurality of outlet ports. The fluid circulation assembly further includes a valve in fluid communication with the diverter via one or more of the plurality of outlet ports. The valve includes a housing, a dual check valve assembly mounted in the housing, and a plurality of conduits. The dual check valve assembly is configured to selectively direct fluid from the diverter to one or more of the plurality of conduits.

In another aspect of the present disclosure, a fluid circulation assembly is provided. The fluid circulation assembly includes a pump, a diverter, and a valve. The diverter includes an inlet and a plurality of outlet ports. The inlet of the diverter is in fluid communication with the pump for receiving fluid from the pump. The valve is in fluid communication with the diverter via one or more of the plurality of outlet ports. The valve includes a housing, a dual check valve assembly mounted in the housing and a plurality of conduits. The dual check valve assembly selectively directs fluid from the diverter to one or more of the plurality of conduits.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to, e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "wash fluid" refers to a liquid used for washing and/or rinsing the articles and is typically made up of water that may include other additives such as detergent or other treatments.

Figure 1:
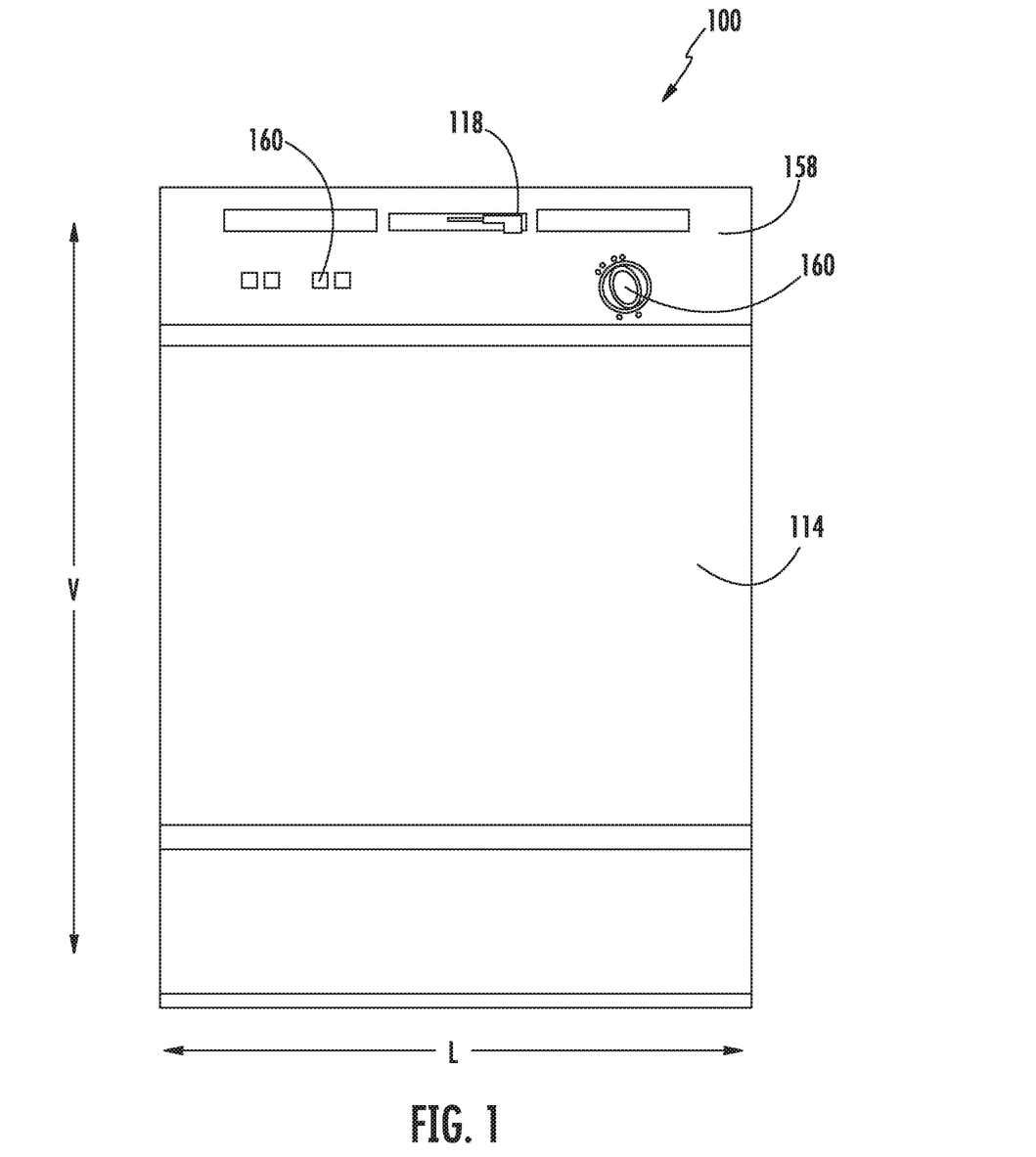
FIG. 1 provides a front view of a dishwasher appliance which may include embodiments of the present disclosure.
Figure 2:
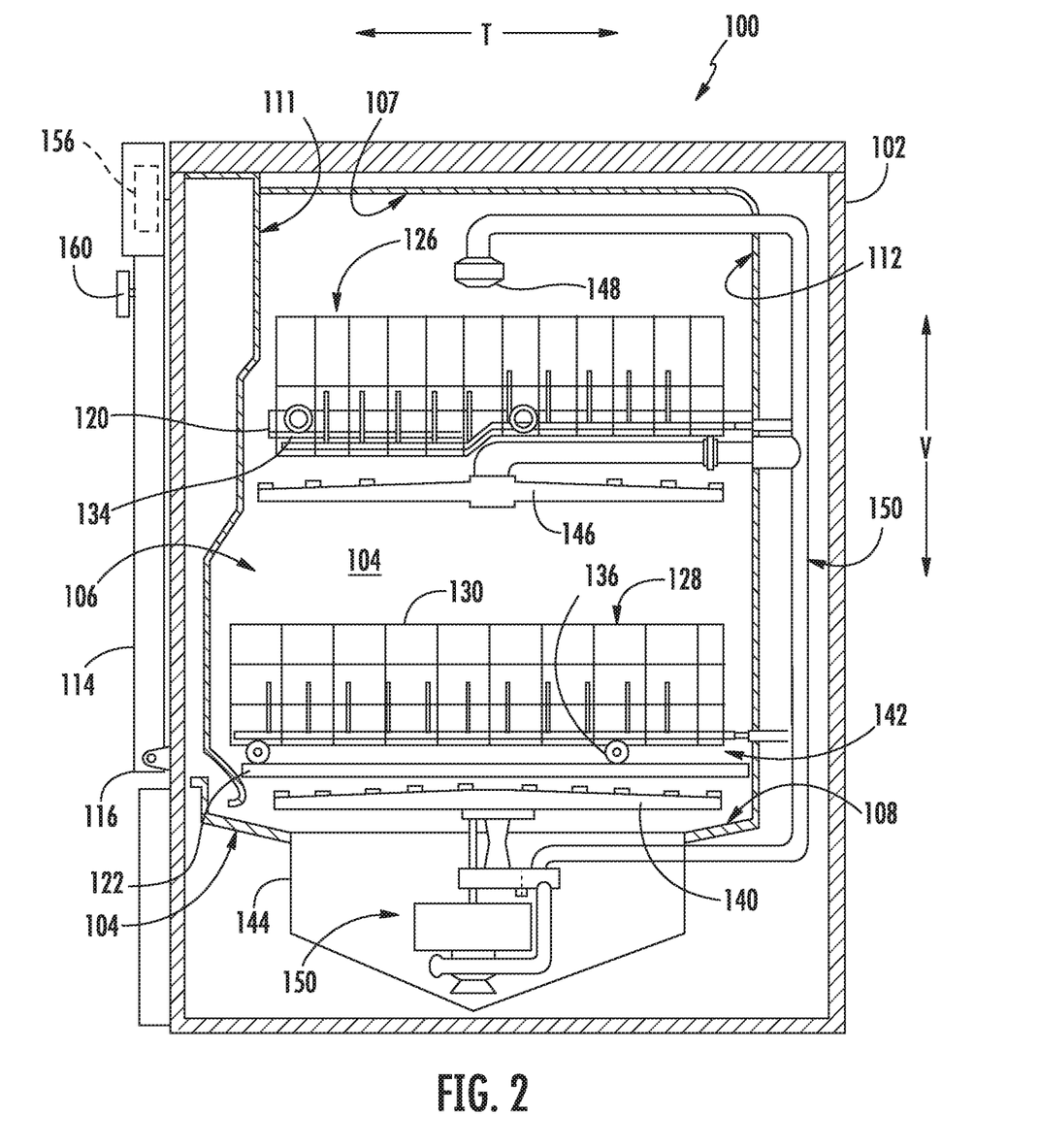
FIG. 2 provides a section view of the dishwasher appliance of FIG. 1.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown in FIG. 2, the tub extends between a top 107 and a bottom 108 along a vertical direction V, between a first side and a second side along a lateral direction L, and between a front side 111 and a rear side 112 along a transverse direction T. Each of the vertical direction V, lateral direction L, and transverse direction T are mutually perpendicular to one another. The tub 104 includes a front opening (not shown) and a door 114 hinged at its bottom 116 for movement between a normally closed vertical position (shown in FIGS. 1 and 2), wherein the wash chamber 106 is sealed shut for washing operation, and a horizontal open position for loading and unloading of articles from the dishwasher 100. Latch 118 is used to lock and unlock door 114 for access to wash chamber 106.

Upper and lower guide rails 120, 122 are mounted on the first and second sides of tub 104 and accommodate roller-equipped rack assemblies 126 and 128. Each of the rack assemblies 126, 128 is fabricated into lattice structures including a plurality of elongated members 130 (for clarity of illustration, not all elongated members making up assemblies 126 and 128 are shown in FIG. 2). Each rack 126, 128 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 134 and 136, for example, mounted onto racks 126 and 128, respectively. A silverware basket (not shown) may be removably attached to rack assembly 128 for placement of silverware, utensils, and the like, that are otherwise too small to be accommodated by racks 126, 128.

The dishwasher 100 further includes a lower spray arm assembly 140 that will be described in more detail below. Lower spray arm assembly 140 may be disposed in a lower region 142 of the wash chamber 106 and above a tub sump portion 144 so as to rotate in relatively close proximity to rack assembly 128. A mid-level spray arm assembly 146 is located in an upper region of the wash chamber 106 and may be located in close proximity to upper rack 126. Additionally, an upper spray assembly 148 may be located above the upper rack 126. As will be described in detail below, spray arm assemblies 140, 146, 148 may be part of a fluid circulation assembly 150 for circulating water and dishwasher fluid in the tub 104.

Each spray arm assembly 140, 146, 148 includes an arrangement of discharge ports or orifices for directing washing liquid received from fluid circulation assembly 150 onto dishes or other articles located in rack assemblies 126 and 128. The arrangement of the discharge ports, also referred to as jets, apertures, or orifices, may provide a rotational force by virtue of washing fluid flowing through the discharge ports. Alternatively, spray arm assemblies 140, 146, 148 may be motor-driven. The resultant movement of the spray arm assemblies 140, 146, 148 provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only, and are not limitations of the present subject matter.

The dishwasher 100 is further equipped with a controller 156 to regulate operation of the dishwasher 100. The controller 156 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 156 may be positioned in a variety of locations throughout dishwasher 100. In the illustrated embodiment, the controller 156 may be located within a control panel area 158 of door 114 as shown in FIGS. 1 and 2. In such an embodiment, input/output ("I/O") signals may be routed between the control system and various operational components of dishwasher 100 along wiring harnesses that may be routed through the bottom 116 of door 114. Typically, the controller 156 includes a user interface panel/controls 160 through which a user may select various operational features and modes and monitor progress of the dishwasher 100. In one embodiment, the user interface 160 may represent a general purpose I/O ("GPIO") device or functional block. In one embodiment, the user interface 160 may include input components, such as one or more of a variety of electrical, mechanical or electro-mechanical input devices including rotary dials, push buttons, and touch pads.

The user interface 160 may include a display component, such as a digital or analog display device designed to provide operational feedback to a user. The user interface 160 may be in communication with the controller 156 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 160, different configurations may be provided for racks 126, 128, different spray arm assemblies 140, 146, 148 may be used, and other differences may be applied as well.

Figure 3:
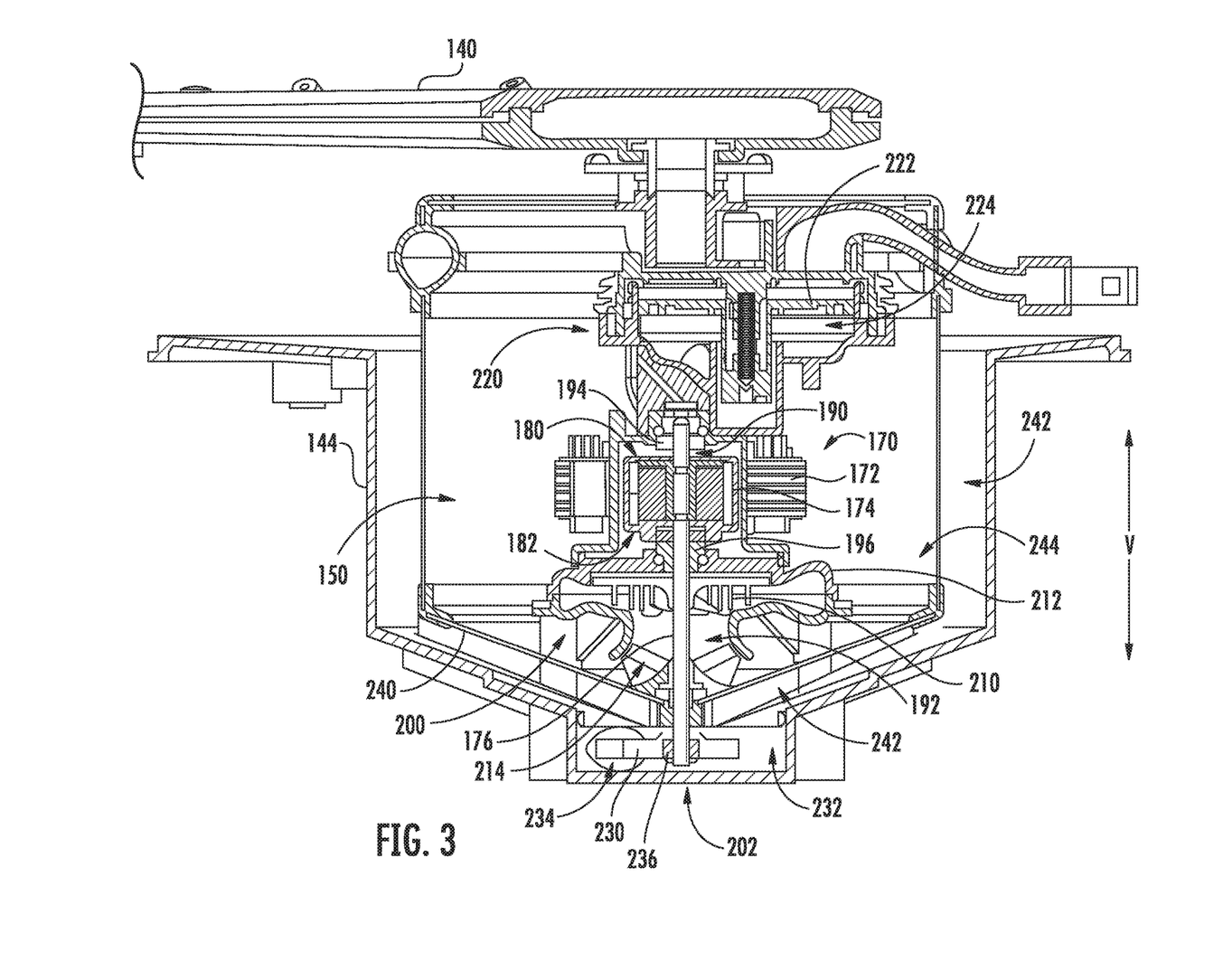
FIG. 3 provides a section view of a fluid circulation assembly according to embodiments of the present disclosure.

Referring now to FIG. 3, a fluid circulation assembly 150 according to an example embodiment of the present subject matter will be described. Fluid circulation assembly 150 may include a drive motor 170 that may be disposed within sump portion 144 of tub 104 and may be configured to rotate multiple components of dishwasher 100. As best shown in FIG. 3, drive motor 170 may be, for example, a brushless DC motor having a stator 172, a rotor 174, and a drive shaft 176 attached to rotor 174. A controller or control board (not shown) may control the speed of motor 170 and rotation of drive shaft 176 by selectively applying electric current to stator 172 to cause rotor 174 and drive shaft 176 to rotate. Although drive motor 170 is illustrated herein as a brushless DC motor, it should be appreciated that any suitable motor may be used while remaining within the scope of the present subject matter. For example, according to alternative embodiments, drive motor 170 may instead be a synchronous induction motor.

According to an exemplary embodiment, drive motor 170 and all its components may be potted. In this manner, drive motor 170 may be shock-resistant, submersible, and generally more reliable. Notably, because drive motor 170 is mounted inside wash chamber 106 and is completely submersible, no seals are required and the likelihood of leaks is reduced. In addition, because drive motor 170 is mounted in the normally unused space between lower spray arm 140 and a bottom wall of sump portion 144, instead of beneath the sump portion 144, this design is inherently more compact than conventional designs.

According to an exemplary embodiment, fluid circulation assembly 150 may be vertically mounted within sump portion 144 of wash chamber 106. More particularly, drive motor 170 of fluid circulation assembly 150 may be mounted such that drive shaft 176 is oriented along vertical direction V (FIG. 2) of dishwasher 100. So oriented, drive motor 170 may include a top side 180 facing top 107 of tub 104 and a bottom side 182 facing away from the top 107 of tub 104.

As best shown in FIG. 3 and described below, rotatable drive shaft 176 may extend out of both top side 180 and bottom side 182 of drive motor 170. More particularly, a top portion 190 of drive shaft 176 may extend out of top side 180 of motor 170 toward top 107 of tub 104 and a bottom portion 192 of drive shaft 176 may extend out of bottom side 182 of motor 170 away from top 107 of tub 104. Notably, top portion 190 and bottom portion 192 may be part of the same, continuous, straight drive shaft 176 and thus rotate at the same speed.

Referring still to FIG. 3, drive shaft 176 is rotatably supported by an upper bearing 194 and a lower bearing 196. As illustrated, upper bearing 194 is positioned at and operably coupled with top portion 190 of drive shaft 176 and lower bearing 196 is positioned at and operably coupled with bottom portion 192 of drive shaft 176. As illustrated, bearings 194, 196 are graphite sleeve bearings. However, it should be appreciated that any suitable bearing may be used while remaining within the scope of the present subject matter. For example, bearings 194, 196 may be any suitable combination of roller bearings, ball bearings, thrust bearings, bush bearings, etc.

As illustrated in FIG. 3, fluid circulation assembly 150 further includes a filter 240. In general, filter 240 may define an unfiltered region 242 and a filtered region 244 within sump portion 144. During a wash or rinse cycle, wash fluid sprayed on dishes or other articles within wash chamber 106 falls into the unfiltered region 242. Wash fluid passes through filter 240 which removes food particles, resulting in relatively clean wash fluid within filtered region 244. As used herein, "food particles" refers to food soil, particles, sediment, or other contaminants in the wash fluid which are not intended to travel through filter 240. Thus, a food particle seal may allow water or other wash fluids to pass from the unfiltered region 242 to the filtered region 244 while preventing food particles entrained within that wash fluid from passing along with the wash fluid.

As illustrated, filter 240 is a fine mesh filter constructed from a perforated stainless steel plate. Filter 240 may include a plurality of perforated holes, e.g., approximately $15/1000$ of an inch in diameter, such that wash fluid may pass through filter 240, but food particles entrained in the wash fluid do not pass through filter 240. However, according to alternative embodiments, filter 240 may be any structure suitable for filtering food particles from wash fluid passing through filter 240. For example, filter 240 may be constructed from any suitably rigid material, may be formed into any suitable shape, and may include apertures of any suitable size for capturing particulates.

Still referring to FIG. 3, bottom portion 192 of drive shaft 176 is configured for driving a circulation or wash pump assembly 200 and a drain pump assembly 202. The wash pump assembly 200 and the drain pump assembly 202 may each be coupled to the bottom portion 192 of drive shaft 176, e.g., with the wash pump assembly 200 above the drain pump assembly 202 and below the motor 170 along the vertical direction V. Wash pump assembly 200 may generally be configured for circulating wash fluid within wash chamber 106 during wash and/or rinse cycles. Drain pump assembly 202 may generally be configured for periodically discharging soiled wash from dishwasher 100. Each of these assemblies will be described in more detail below.

According to an exemplary embodiment, wash pump assembly 200 may be configured to provide wash fluid to spray arm assemblies 140, 146, 148. More specifically, wash pump assembly 200 may include a wash pump impeller 210 disposed on bottom portion 192 of drive shaft 176 within a pump housing 212. Pump housing 212 defines a pump intake 214 for drawing wash fluid into wash pump impeller 210. According to the illustrated embodiment, pump intake 214 is facing downward along the vertical direction V and is located very near the bottom of sump portion 144. In this manner, the amount of water required to prime and operate wash pump assembly 200 is minimized. This is particularly advantageous when running low water cycles for the purpose of water and energy savings.

In operation, wash pump impeller 210 draws wash fluid in from sump portion 144 and pumps it to a diverter assembly 220. Diverter assembly 220 may include a diverter disc 222 disposed within a diverter chamber 224 for selectively distributing the wash fluid to the spray arm assemblies 140, 146, 148. More particularly, diverter disc 222 may be rotatably mounted about the vertical direction V. Diverter disc 222 may have an aperture that is configured to align with one of a plurality of outlet ports 303, 304, 305, and 306 (FIG. 4) at the top of diverter chamber 224. When diverter disc 222 rotates about the vertical direction V, the aperture moves from alignment with one of the plurality of outlet ports 303, 304, 305, and 306 to alignment with a next adjacent one of the plurality of outlet ports 303, 304, 305, and 306.

In addition, drain pump assembly 200 may be configured for discharging soiled wash fluid from the dishwasher 100 periodically. More specifically, drain pump assembly 202 may include a drain pump impeller 230 disposed on bottom portion 192 of drive shaft 176 below the wash pump impeller 210 and within a drain pump volute 232. Drain pump volute 232 is positioned at the very bottom of sump portion 144, such that wash fluid collects within drain pump volute 232. During a drain cycle, drain pump impeller 230 is rotated and soiled wash fluid is discharged from dishwasher 100 through a discharge conduit 234. After some or all of the soiled wash fluid is discharged, fresh water and/or wash additives may be added and the wash or rinse cycle may be repeated. Notably, drain pump impeller 230 is coupled to bottom portion 192 of drive shaft 176 using a one-way clutch 236. In this regard, during a wash pump mode, drive motor 170 rotates in one direction, e.g., a first direction, pumping filtered wash fluid using wash pump impeller 210. However, when drive shaft 176 rotates in the first direction, one-way clutch 236 is disengaged, so drain pump impeller 230 does not rotate. By contrast, during a drain pump mode, drive motor 170 rotates in the opposite direction, e.g., a second direction opposing the first direction, thereby engaging one-way clutch 236 and causing drain pump impeller 230 to rotate and discharge wash fluid.

Additionally, the wash pump impeller 210 may be configured such that it is more efficient in the first direction of rotation than in the second direction of rotation. For example, as is generally understood in the art, the wash pump impeller 210 may include blades (not shown), and the blades may have a cross-sectional profile and may define an angle with respect to the vertical direction V. Thus, the wash pump impeller 210 may be configured such that the profile and angle of the blades make it more efficient in the first direction of rotation than in the second direction of rotation. The general principles of impeller blade design are understood by those of ordinary skill in the art and are not discussed in greater detail herein.

Figure 4:
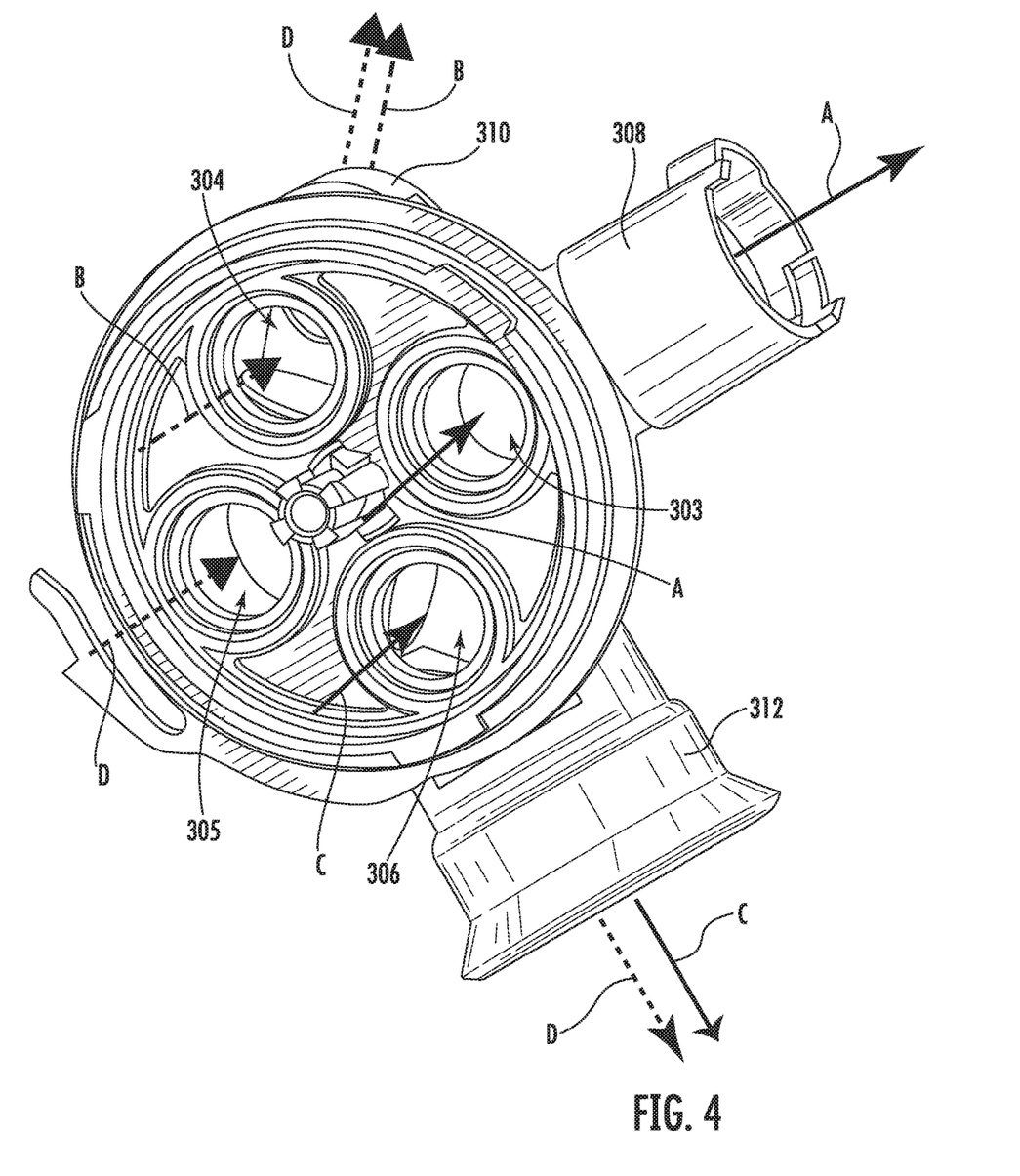
FIG. 4 provides a perspective view of a portion of the fluid circulation assembly of FIG. 3.

As illustrated in FIG. 4, the exemplary diverter assembly 220 includes a plurality of outlet ports, e.g., the diverter assembly 220 may include four outlet ports, including first outlet port 303, second outlet port 304, third outlet port 305, and fourth outlet port 306. Diverter assembly 220 also includes a valve 300 (see, e.g., FIGS. 5 through 8), more fully described below, that can be selectively actuated, e.g., by hydraulic actuation, depending on which of the outlet ports 303, 304, 305, and 306 receives the flow of wash fluid, e.g., from an aperture of the diverter disc 222, as described above. As shown in FIG. 4, the valve 300 is configured to selectively direct the wash fluid to one or more of a plurality of conduits 308, 310, and 312. As illustrated for example in FIG. 4 and described in more detail below, the valve 300 may provide a first flow path A from the first outlet port 303 to the first conduit 308, a second flow path B from the second outlet port 304 to the second conduit 310, a third flow path C from the fourth outlet port 306 to the third conduit 312, and a fourth flow path D from the third outlet port 305 to both of the second conduit 310 and the third conduit 312. For example, first conduit 308 may be fluidly connected with a fluid-using component, e.g., for cleaning silverware. Second conduit 310 may be fluidly connected with lower spray arm assembly 140. Third conduit 312 may be fluidly connected with upper spray assembly 148 and mid-level spray arm assembly 146. Other spray assemblies and connection configurations may be used as well. As used herein, the terms "first," "second," and "third" do not necessarily denote order or sequence, e.g., in the foregoing example embodiments, the diverter may be configured to provide flow to the third conduit before the second conduit. As such, the rotation of diverter disc 222 may be used to selectively place pump 210 in fluid communication with one or more of the spray assemblies 140, 146, or 148, and/or another fluid-using component, by way of conduits 308, 310, and 312, as described in an exemplary embodiment below.

Figure 5:
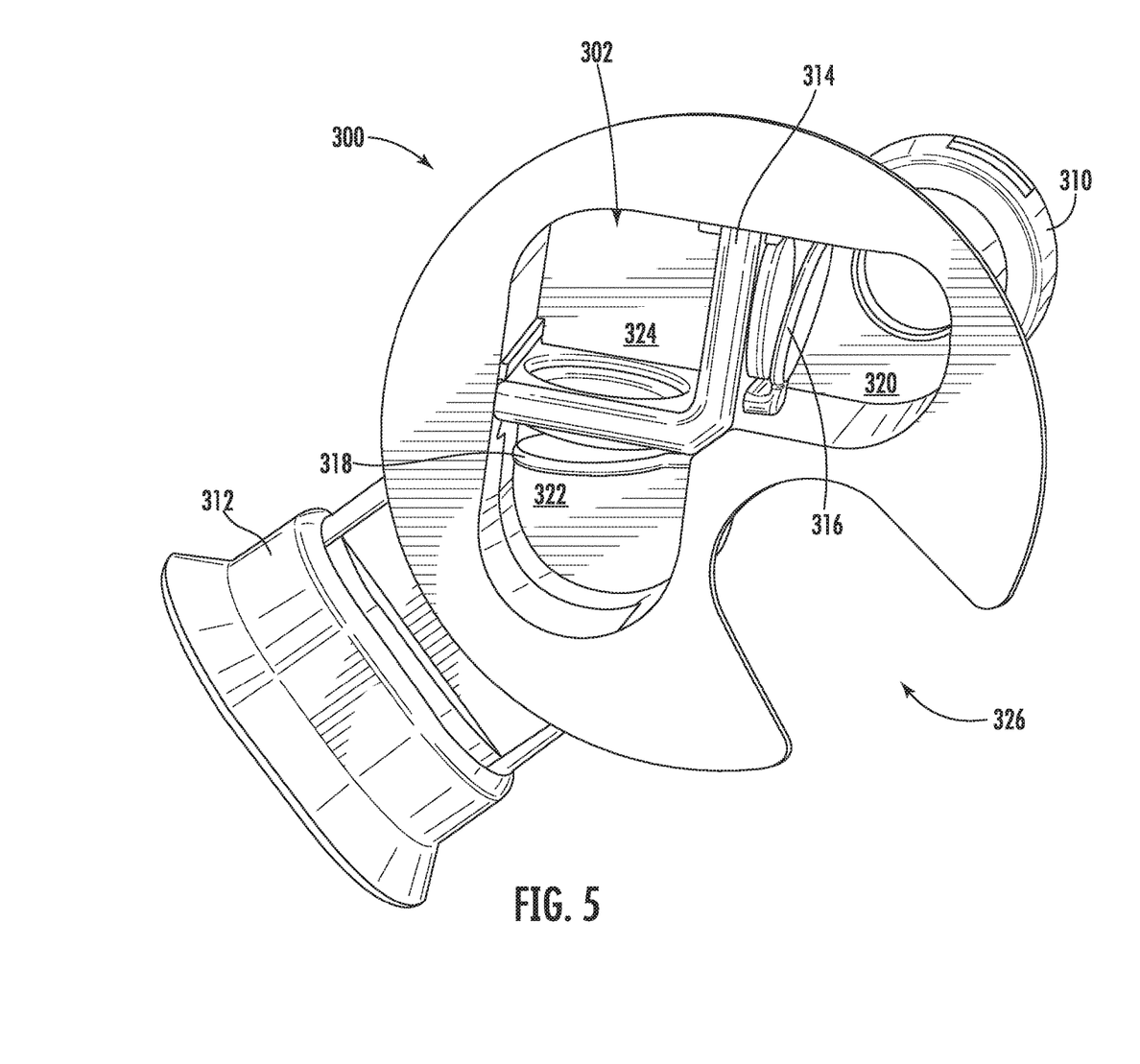
FIG. 5 provides a perspective view of internal components of the portion of the fluid circulation assembly of FIG. 4.

As illustrated for example in FIG. 5, the valve 300 may define a housing 302 and the housing 302 may be divided into a plurality of chambers by a check valve assembly 314. For example, in some embodiments the check valve assembly 314 may be a dual check valve assembly which includes a first check valve 316 and a second check valve 318. In such embodiments, the dual check valve assembly 314 may divide the housing 302 into three chambers, e.g., a first chamber 320, a second chamber 322, and a third chamber 324. As illustrated for example in FIG. 5, the second conduit 310 may be in fluid communication with the first chamber 320 and the third conduit 312 may be in fluid communication with the second chamber 322. Also as illustrated in FIG. 5 and described in more detail below, both the second conduit 310 and the third conduit 312 may be in fluid communication with the third chamber 324. Further, the valve 300 may include an aperture 326, and the aperture 326 may be aligned with the first outlet port 303 (FIG. 4) such that fluid flow from the outlet port 303, along the flow path A illustrated in FIG. 4, bypasses the dual check valve assembly 314 and continues to the first conduit 308.

As illustrated in FIG. 5, the dual check valve assembly 314 permits fluid flow from the third chamber 324 to the first chamber 320 and the second chamber 322, while preventing or limiting fluid flow from the first and second chambers 320 and 322 to the third chamber 324. For example, the first check valve 316 is configured and arranged to permit fluid flow from the third chamber 324 to the first chamber 320 while preventing or limiting fluid flow from the first chamber 320 to the third chamber 324. Similarly, in the illustrated example embodiment, the second check valve 318 is configured and arranged to permit fluid flow from the third chamber 324 to the second chamber 322 while preventing or limiting fluid flow from the second chamber 322 to the third chamber 324.

Figure 6:
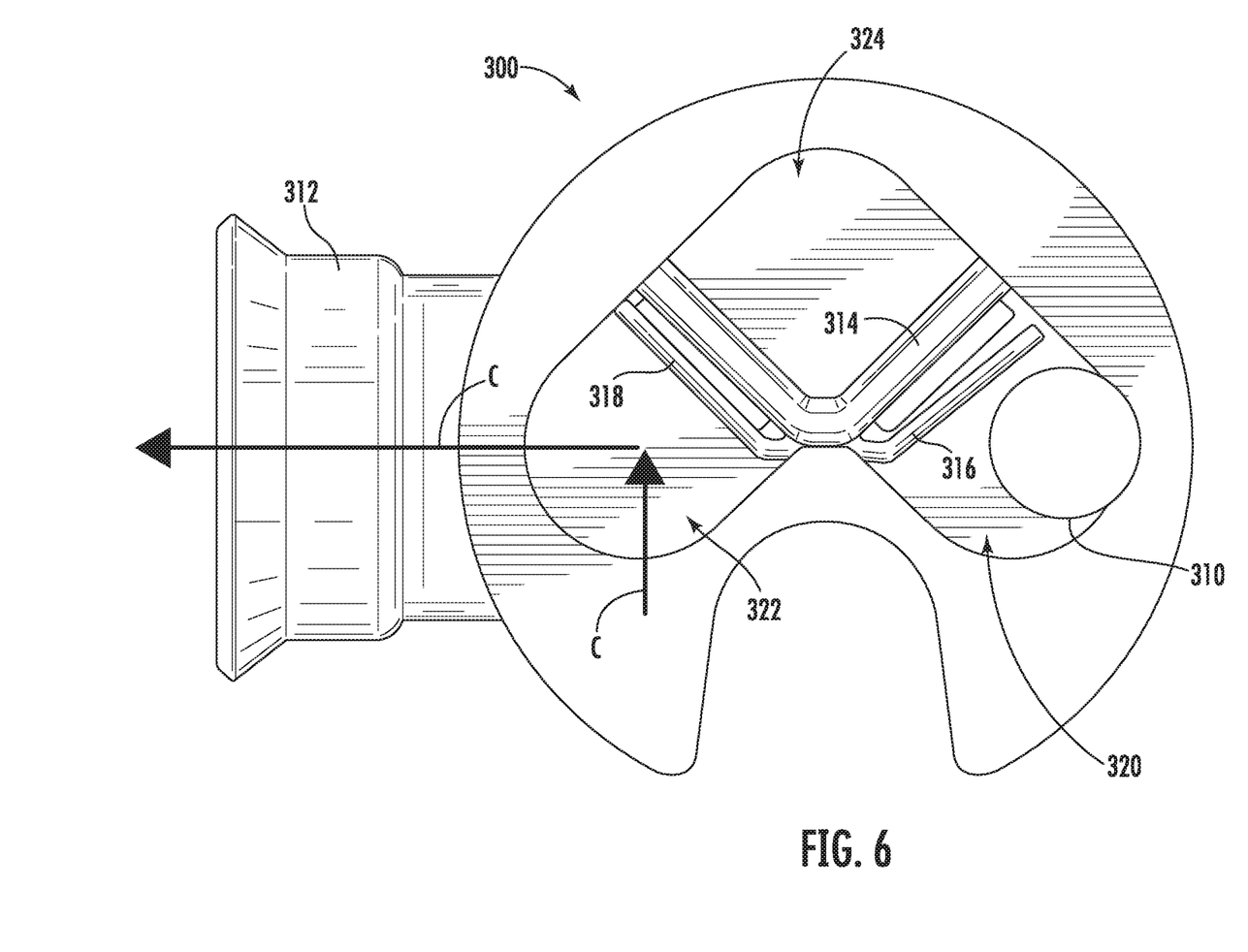
FIG. 6 provides a bottom view of the internal components of FIG. 5 with a dual check valve in a first position.
Figure 7:
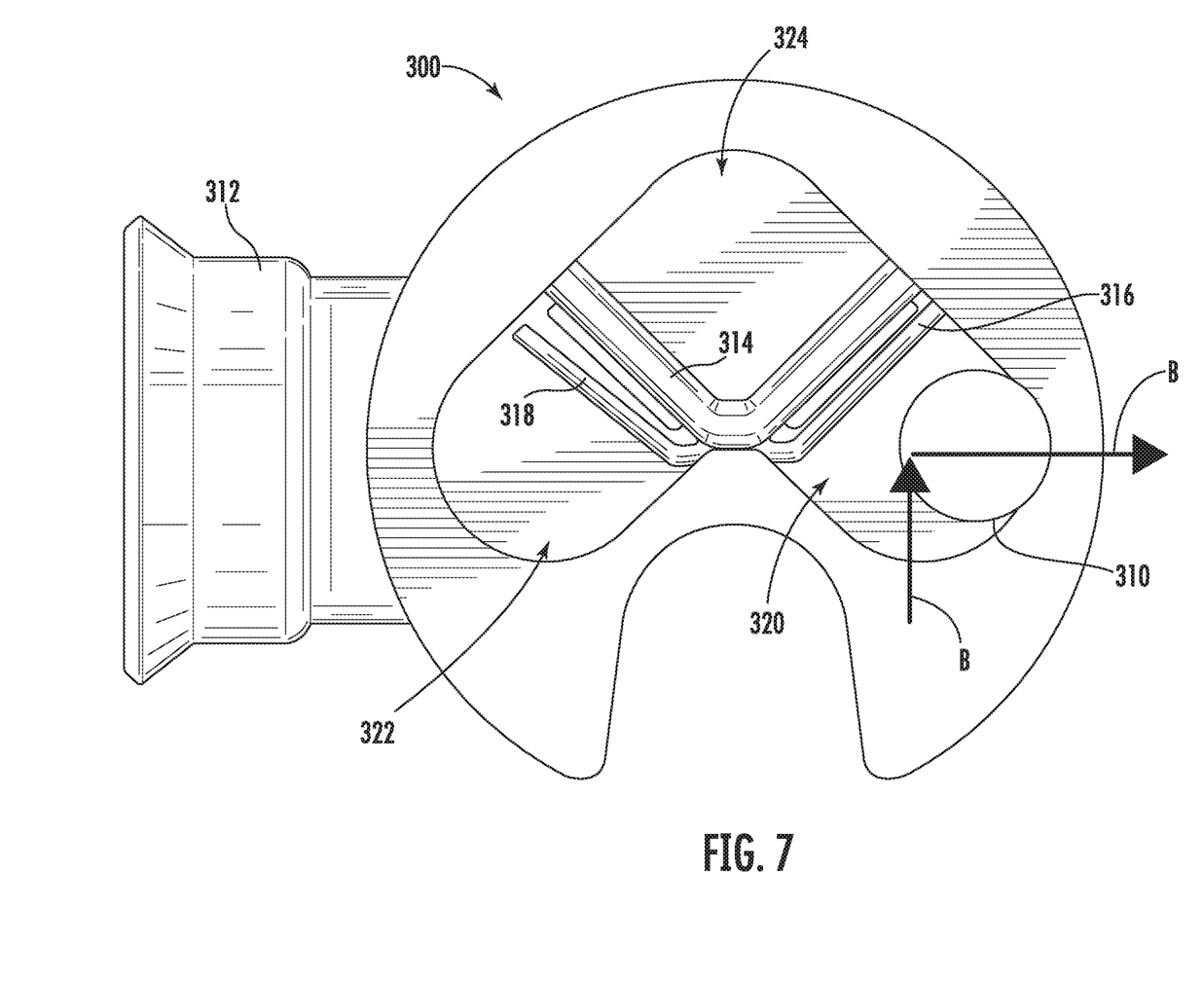
FIG. 7 provides a bottom view of the internal components of FIG. 5 with the dual check valve in a second position.
Figure 8:
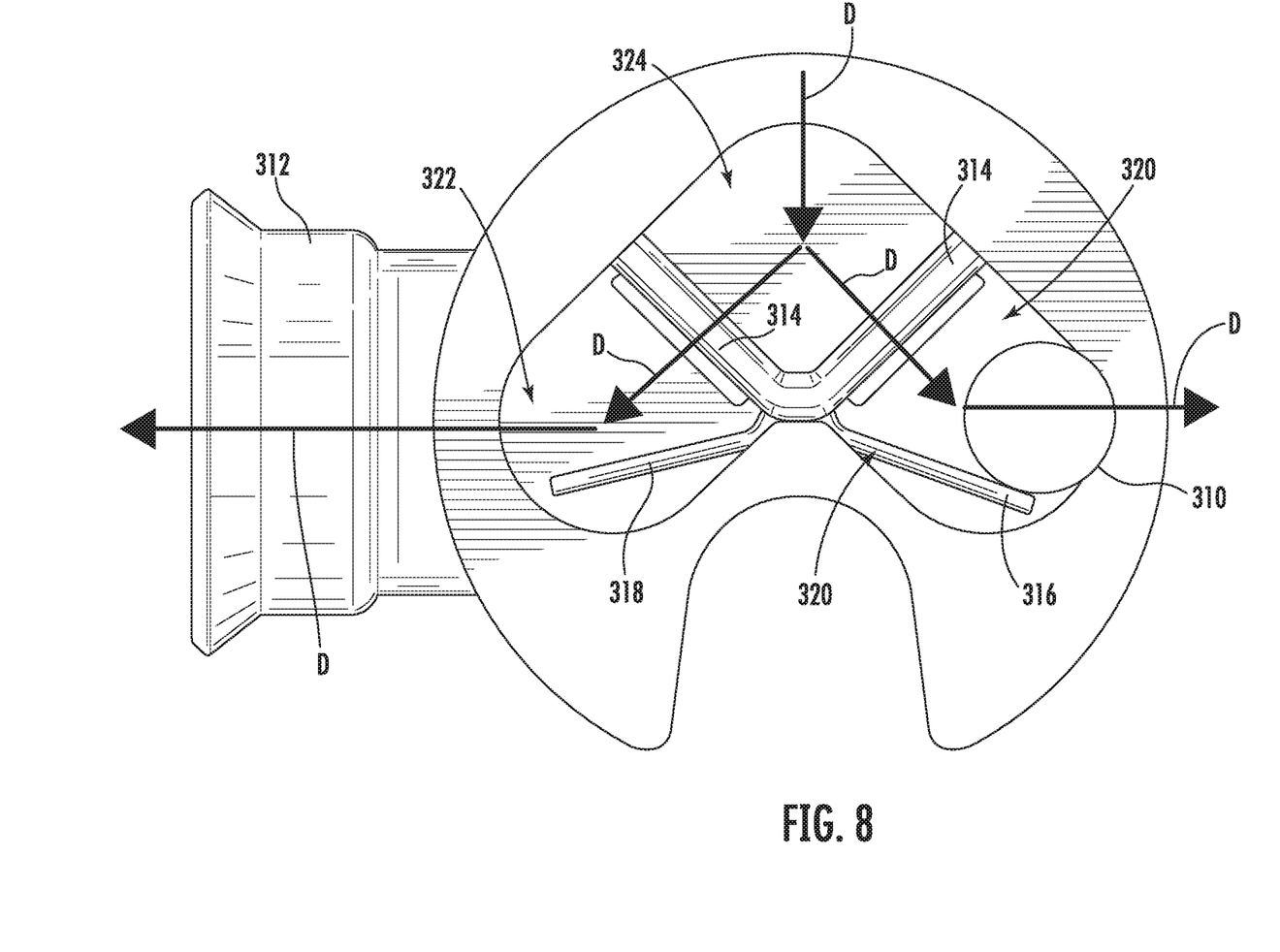
FIG. 8 provides a bottom view of the internal components of FIG. 5 with the dual check valve in a third position.

For example, as illustrated in FIGS. 5-8, the valve assembly 314 may include a substrate which partitions the housing 302 into the various chambers 320, 322, and 324. The substrate may include a plurality of apertures which generally provide fluid communication between and among the chambers 320, 322, and 324. The first check valve 316 and the second check valve 318 may each be movably connected to the substrate, e.g., by a hinge or other flexible rotatable joint, at a respective aperture and movable between a closed position and an open position (FIG. 8). For example, as described in more detail below, the second check valve 318 is illustrated in the closed position in FIG. 6, the first check valve 316 is illustrated in the closed position in FIG. 7, and both check valves 316 and 318 are depicted in the open position in FIG. 8. As shown, the first and second check valves 316 and 318 each obstruct or close off a respective aperture in the closed position. For example, one or both of the substrate and the valves 316, 318 may comprise a resilient material, e.g., silicone rubber or other suitable elastomeric material, to provide a sealing engagement when the valves 316, 318, are in the closed position. In some exemplary embodiments, the substrate may include a rigid material, e.g., a plastic material, with an elastomeric material, e.g., silicone rubber, overmolded onto the substrate to form gaskets at the apertures in the substrate.

FIG. 6 illustrates the valve 300 with the dual check valve assembly 314 in a first position. More specifically, in FIG. 6 the first check valve 316 is in a neutral or resting position where, as illustrated, the first check valve 316 is slightly open in the absence of a biasing force. The first position of the valve assembly 314 illustrated in FIG. 6 also includes the second check valve 318 in the closed position. As may be seen from FIGS. 4 and 6, when fluid flows along flow path C, e.g., when fluid is directed by the diverter 222 to the fourth outlet port 306 (FIG. 4), the fluid will then enter the second chamber 322 (FIG. 6) and the force of the fluid will bias the second check valve 318 to the closed position, as illustrated in FIG. 6. Thus, flow path C continues from the second chamber 322 to the third conduit 312. As such, the fluid circulation assembly 150 may direct fluid to the upper spray assembly 148 and/or mid-level spray assembly 146 when the dual check valve assembly 314 is in the first position. For example, the wash pump assembly 200 may draw wash fluid from the sump 144 and may urge such wash fluid through the diverter assembly 220 where, based on the position of the diverter disc 222, the wash fluid may then be directed, e.g., through an aperture of the diverter disc 222, to the fourth outlet port 306 and into the second chamber 322 of the valve 300, where the fluid will bias the second check valve 318 closed such that the fluid will exit the valve 300 at third conduit 312.

FIG. 7 illustrates the valve 300 with the dual check valve assembly 314 in a second position. More specifically, in FIG. 6 the first check valve 316 is in the closed position and the second check valve 318 is in the neutral position. As may be seen from FIGS. 4 and 7, when fluid flows along flow path B, e.g., when fluid is directed by the diverter 222 to the second outlet port 304 (FIG. 4), the fluid will then enter the first chamber 320 (FIG. 7) and the force of the fluid will bias the first check valve 316 to the closed position, as illustrated in FIG. 7. Thus, flow path B continues from the first chamber 320 of the valve 300 to the second conduit 310. As such, the fluid circulation assembly 150 may direct fluid to the lower spray assembly 140 when the dual check valve assembly 314 is in the second position. For example, the wash pump assembly 200 may draw wash fluid from the sump 144 and may urge such wash fluid through the diverter assembly 220 where, based on the position of the diverter disc 222, the wash fluid may then be directed, e.g., through an aperture of the diverter disc 222, to the second outlet port 304 and into the first chamber 320 of the valve 300, where the fluid will bias the first check valve 316 closed such that the fluid will exit the valve 300 at second conduit 310.

FIG. 8 illustrates the valve 300 with the dual check valve assembly 314 in a third position, where the first check valve 316 and the second check valve 318 are each in the open position. As illustrated in FIG. 8, when fluid, e.g., wash fluid from the wash pump assembly 200, flows into the third chamber 324, e.g., from the third outlet port 305 of the diverter assembly along flow path D (FIG. 4), the fluid will bias the first and second check valves 316 and 318 to the open position, whereby the fluid may flow from the third chamber 324 into the first and second chambers 320 and 322. Thus, when the dual check valve assembly 314 is in the third position, the fluid circulation assembly 150 may direct fluid to multiple spray assemblies, e.g., any two or all three of the spray assemblies 140, 146, and 148.

In accordance with the foregoing, the fluid circulation assembly 150 may advantageously provide various flow schemes or modes. At least one of such modes may be a turbo mode or multi-spray mode, which includes simultaneous operation of more than one spray assembly, such as all three spray assemblies 140, 146, and 148. It should be noted that additional embodiments of the present disclosure may include simultaneous operation of all spray assemblies in a dishwashing appliance, for example, the dishwashing appliance may have only two spray assemblies and the turbo mode may include operating both spray assemblies. Accordingly, the turbo mode or multi-spray mode may provide a reduced overall cycle time for a wash cycle of the dishwashing appliance. Moreover, the fluid circulation assembly 150 may selectively provide the various flow modes without the use of a motor to actuate the diverter 222 or the dual check valve assembly 314. Omitting such motor may advantageously provide improved energy usage and reduced potential leak points.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance defining a vertical direction, a lateral direction, and a transverse direction that are mutually perpendicular, the dishwasher appliance comprising:
   a tub defining a wash chamber for receipt of articles for washing;
   a lower spray assembly located in the wash chamber and configured to direct a spray of fluid into the wash chamber;
   an upper spray assembly located in the wash chamber above the lower spray assembly along the vertical direction, the upper spray assembly configured to direct a spray of fluid into the wash chamber;
   a sump positioned at a bottom of the wash chamber for receiving fluid from the wash chamber; and
   a fluid circulation assembly, the fluid circulation assembly comprising:
      a pump in fluid communication with the sump, the pump configured to draw fluid from the sump;
      a diverter comprising an inlet in fluid communication with the pump for receiving fluid from the pump and a plurality of outlet ports, the plurality of outlet ports comprising a first outlet port, a second outlet port, a third outlet port, and a fourth outlet port; and
      a valve in fluid communication with the diverter via one or more of the plurality of outlet ports, the valve comprising a housing, a dual check valve assembly mounted in the housing, and a plurality of conduits, the plurality of conduits comprising a first conduit, a second conduit, and a third conduit, the dual check valve assembly configured to selectively direct fluid from the diverter to one or more of the plurality of conduits, wherein the valve is configured to direct fluid from the first outlet port to the first conduit of the valve, from the second outlet port to the second conduit of the valve, from the fourth outlet port to the third conduit of the valve, and from the third outlet port to the second conduit and the third conduit.

2. The dishwasher appliance of claim 1, wherein the dual check valve assembly defines a first chamber, a second chamber, and a third chamber within the housing of the valve.

3. The dishwasher appliance of claim 2, wherein the dual check valve assembly permits fluid communication from the third chamber to the first and second chambers and limits fluid communication from the first chamber and the second chamber to the third chamber.

4. The dishwasher appliance of claim 1, wherein the dual check valve assembly comprises a first check valve configured to direct fluid flow from the valve to the lower spray assembly when the first check valve is in a closed position and a second check valve configured to direct fluid flow from the valve to the upper spray assembly when the second check valve is in a closed position, and wherein the dual check valve assembly is configured to direct fluid flow to both the lower spray assembly and the upper spray assembly when the first check valve is in an open position and the second check valve is in an open position.

5. The dishwasher appliance of claim 1, wherein the housing comprises a first chamber, a second chamber, and a third chamber, the first chamber of the housing separated from the third chamber of the housing by a first check valve of the dual check valve assembly, and the second chamber of the housing separated from the third chamber of the housing by a second check valve of the dual check valve assembly.

6. The dishwasher appliance of claim 5, wherein the first check valve is configured to permit fluid communication from the third chamber to the first chamber and to limit fluid communication from the first chamber to the third chamber, and wherein the second check valve is configured to permit fluid communication from the third chamber to the second chamber and to limit fluid communication from the second chamber to the third chamber.

7. The dishwasher appliance of claim 5, wherein the first conduit is in direct fluid communication with the first outlet port of the plurality of outlet ports, the second conduit is in direct fluid communication with the first chamber, and the third conduit is in direct fluid communication with the second chamber.

8. The dishwasher appliance of claim 7, wherein the second conduit and the third conduit are selectively in fluid communication with the third chamber via the dual check valve assembly.

9. A fluid circulation assembly, comprising:
a pump;
a diverter comprising an inlet and a plurality of outlet ports, the inlet of the diverter in fluid communication with the pump for receiving fluid from the pump; and
a valve in fluid communication with the diverter via one or more of the plurality of outlet ports, the plurality of outlet ports of the diverter comprising a first outlet port, a second outlet port, a third outlet port, and a fourth outlet port, the valve comprising a housing, a dual check valve assembly mounted in the housing, and a plurality of conduits, the plurality of conduits comprising a first conduit, a second conduit, and a third conduit, the dual check valve assembly configured to selectively direct fluid from the diverter to one or more of the plurality of conduits, wherein the valve is configured to direct fluid from the first outlet port to the first conduit of the valve, from the second outlet port to the second conduit of the valve, from the fourth outlet port to the third conduit of the valve, and from the third outlet port to the second conduit and the third conduit.

10. The fluid circulation assembly of claim 9, wherein the dual check valve assembly defines a first chamber, a second chamber, and a third chamber within the housing of the valve.

11. The fluid circulation assembly of claim 10, wherein the dual check valve assembly permits fluid communication from the third chamber to the first and second chambers and limits fluid communication from the first chamber and the second chamber to the third chamber.

12. The fluid circulation assembly of claim 9, wherein the dual check valve assembly comprises a first check valve configured to direct fluid flow from the valve to a first spray assembly when the first check valve is in a closed position and a second check valve configured to direct fluid flow from the valve to a second spray assembly when the second check valve is in a closed position, and wherein the dual check valve assembly is configured to direct fluid flow to both the first spray assembly and the second spray assembly when the first check valve is in an open position and the second check valve is in an open position.

13. The fluid circulation assembly of claim 9, wherein the housing comprises a first chamber, a second chamber, and a third chamber, the first chamber of the housing separated from the third chamber of the housing by a first check valve of the dual check valve assembly, and the second chamber of the housing separated from the third chamber of the housing by a second check valve of the dual check valve assembly.

14. The fluid circulation assembly of claim 13, wherein the first check valve is configured to permit fluid communication from the third chamber to the first chamber and to limit fluid communication from the first chamber to the third chamber, and wherein the second check valve is configured to permit fluid communication from the third chamber to the second chamber and to limit fluid communication from the second chamber to the third chamber.

15. The fluid circulation assembly of claim 13, wherein the first conduit is in direct fluid communication with the first outlet port of the plurality of outlet ports, the second conduit is in direct fluid communication with the first chamber, and the third conduit is in direct fluid communication with the second chamber.

16. The fluid circulation assembly of claim 15, wherein the second conduit and the third conduit are selectively in fluid communication with the third chamber via the dual check valve assembly.

* * * * *